(12) United States Patent
Taylor, Jr.

(10) Patent No.: US 11,614,544 B1
(45) Date of Patent: Mar. 28, 2023

(54) METHODS, SYSTEMS, AND DEVICES FOR POSITIONING AND TIMING USING TERRESTRAL RADIO

(71) Applicant: Setter Research, Inc., Greensboro, NC (US)

(72) Inventor: David W. A. Taylor, Jr., Greensboro, NC (US)

(73) Assignee: Setter Research, Inc., Greensboro, NC (US)

( * ) Notice: Subject to any disclaimer, the term of this patent is extended or adjusted under 35 U.S.C. 154(b) by 0 days.

(21) Appl. No.: 17/412,325

(22) Filed: Aug. 26, 2021

Related U.S. Application Data (60) Provisional application No. 63/074,528, filed on Sep. 4, 2020.

(51) Int. Cl.
*G01S 19/25* (2010.01)
*H04W 84/18* (2009.01)
*G01S 19/26* (2010.01)
*G01S 19/24* (2010.01)

(52) U.S. Cl.
CPC ............ *G01S 19/25* (2013.01); *G01S 19/243* (2013.01); *G01S 19/26* (2013.01); *H04W 84/18* (2013.01)

(58) Field of Classification Search
CPC ... G01C 21/16; G01S 1/20; G01S 3/02; G01S 5/02; G01S 11/02; G01S 13/46; G01S 19/23; G01S 19/26; G01S 19/243; H04L 12/26; H04W 4/04; H04W 8/08; H04W 52/02; H04W 64/00; H04W 84/18

USPC ........ 342/387, 458, 463; 375/150, 219, 260, 375/267, 295, 316
See application file for complete search history.

(56) References Cited

U.S. PATENT DOCUMENTS

| | | | |
|---|---|---|---|
| 6,266,014 B1 * | 7/2001 | Fattouche | H04W 64/00 342/450 |
| 2006/0164297 A1 * | 7/2006 | Hernandez-Pajares | G01S 19/32 342/357.27 |
| 2015/0296348 A1 * | 10/2015 | Ghabra | H04W 52/0209 455/456.1 |

* cited by examiner

*Primary Examiner* — Shawkat M Ali
(74) *Attorney, Agent, or Firm* — NK Patent Law (57) ABSTRACT

Disclosed herein are methods, devices, and systems for determining geographic location and time. In one embodiment, a radio and a processor configured for deriving a first signal tone originating from a first remote antenna located at a first location; deriving a second signal tone originating from a second remote antenna located at a second location; deriving a third signal tone originating from a third remote antenna located at a third location; determining a first frequency and a first phase at a first time of the first signal tone; determining a second frequency and a second phase at a second time of the second signal tone; and determining a third frequency and a third phase at a third time of the third signal tone. The method further includes determining a geographic location based on the first, second, and third frequencies; the first, second, and third phases; and the first, second, and third locations.

22 Claims, 5 Drawing Sheets

SYSTEM DIAGRAM
100

METHODS, SYSTEMS, AND DEVICES FOR POSITIONING AND TIMING USING TERRESTRAL RADIO

PRIORITY CLAIM

This application claims priority to U.S. Provisional Patent Application Ser. No. 63/074,528, filed Sep. 4, 2020, titled "METHODS, SYSTEMS, AND DEVICES FOR POSITIONING AND TIMING USING TERRESTRAL RADIO", the disclosure of which is incorporated herein by reference in its entirety.

GOVERNMENT SUPPORT

This invention was made with U.S. Government support under Contract No. 70RSAT18C00000026, a Small Business Innovative Research (SBIR) Phase I contract, awarded by the Department of Homeland Security. The Government may have certain rights in this invention.

TECHNICAL FIELD

The present invention relates to determining geographic location and time such as with use of the Global Positioning System (GPS). Applications of such systems may include navigation, robotics, autonomous systems, security systems, positioning systems, and others. More specifically methods, systems, and devices are disclosed that allow determining geographic location and time without the use of GPS.

BACKGROUND

The global positioning system (GPS) and other global navigation satellite systems (GNSS) provide positioning, navigation, and timing (PNT) most everywhere on earth. GPS and GNSS data impact numerous systems and devices providing positioning and navigation for mobile platforms such as aircraft, automobiles, and farm equipment, synchronizing communications such as cellular systems, providing accurate time to wide diversity of systems, and providing consumers with accurate time and position via smartphones and related devices.

While GPS has revolutionized many industries and applications with continuous and accurate position and time data, limitations and threats to GPS have become increasingly important and expose risks to systems using GPS. Satellite signals received at the earth's surface have very low signal strength, GPS signals can be easily jammed by other local transmitters, either intentionally or unintentionally, that operate in the same spectral band. Hostile actors with criminal or military intent may transmit signals that mimic GPS (a "spoofing" transmission). This action may cause GPS receivers to compute and report incorrect position and/or time without being aware that the measured signals are corrupted. Additionally, GPS satellites or the ground control segment may fail or be disabled due to a system fault or a military conflict.

Even when GPS is operating correctly, the low signal strength and relatively high carrier frequency result in successful operation only when the receiver is within line of sight to the satellites. As a result, GPS receivers are usually ineffective indoors, outdoors in urban canyons (near tall buildings), and other locations where the GPS signals may be blocked or attenuated.

Finally, for uses of GPS such as navigation of aircraft and other safety of life applications, it is vital that the systems' navigation data is validated so that the systems can be assured of PNT reliability and accuracy. One approach to assured PNT would be to employ an alternative technology that is independent of GPS or other GNSS.

As a result of these deficiencies and limitations, alternatives to GPS that can provide accurate PNT data is a critical need. Most implementations of GPS alternatives use technologies that are customized to particular applications and are not broadly applicable, such as distance measuring equipment (DME) used in aviation that provides round-trip radio-frequency (RF) ranging to fixed locations on the ground that is available to a limited number of simultaneous airborne users, LORAN that is available in some coastal regions, or integration of inertial measurement units (IMUs) that provide positioning continuity for limited durations.

One area of research has been to use signals of opportunity, such as Wi-Fi, cellular, and commercial radio and television as navigation signals. Smartphones, for example, use Wi-Fi reception as an indication of location in indoor environments. One area of research has been to use the wide bandwidth of digital television (DTV) to compute RF range or pseudo-range to DTV broadcast towers. These studies have been promising, but results have not yielded an accurate or cost-effective solution.

Accordingly, a critical need exists for methods, systems, and devices that provide general-purpose high-accuracy PNT data over wide areas than can be used by a large number of users and systems.

SUMMARY

The subject matter described herein includes methods, devices, and systems for determining geographic location and time. In one embodiment, a system includes a radio and a processor electrically coupled with the radio. The radio and the processor are configured for a method including; (1) deriving a first signal tone originating from a first remote antenna located at a first location; (2) deriving a second signal tone originating from a second remote antenna located at a second location; (3) deriving a third signal tone originating from a third remote antenna located at a third location; (4) determining a first frequency and a first phase at a first time of the first signal tone; (5) determining a second frequency and a second phase at a second time of the second signal tone; and (6) determining a third frequency and a third phase at a third time of the third signal tone. The method further includes determining a geographic location and time of the system based on the first, second, and third frequencies; the first, second, and third phases; and the first, second, and third locations. The system also includes a memory electrically coupled to the processor. The memory may include a database. The processor may be further configured for determining the first, second, and third locations from the memory.

In some embodiments, the first signal tone may be at least a portion of a first licensed broadcast station signal, the second signal tone may be at least a portion of a second licensed broadcast station signal, and the third signal tone may at least a portion of a third licensed broadcast station signal. The processor may also be further configured for receiving the first location from the first licensed broadcast station signal, receiving the second location from the second licensed broadcast station signal, and receiving the third location from the third licensed broadcast station signal In some embodiments, a signal tone may be the carrier signal from an FM radio broadcast transmission. In some embodiments, a signal tone may be the stereo pilot tone from an FM radio broadcast transmission. In some embodiments, a signal tone may be the carrier signal from a DTV broadcast transmission. In some embodiments, a signal tone may be the pilot tone from DTV broadcast transmission. In some embodiments, the first, second, and third signal tones may use the same type of signal (such as all using FM carrier tone, or all using FM stereo pilot tone, etc.). In some embodiments, each of the first, second, and third signal tones may use the same or different types of transmitted signals.

In some embodiments, the radio and the processor may also be further configured to receive first reference data including first frequency data, first phase data, first time stamp data, and the first location from the first licensed broadcast station signal. The first reference data may also include barometric altimeter measurements. In some embodiments the radio and the processor may be further configured for determining a time offset between a reference receiver time and an estimated local time based at least partially on a local time reference.

In some embodiments, the radio and processor may also be configured for receiving first identity information associated with the first licensed broadcast station signal.

In some embodiments, the radio and the processor may also be configured for (1) receiving a first reference frequency and a first reference phase of the first signal tone measured by a reference receiver at a reference location at a first reference time; (2) receiving a second reference frequency and a second reference phase of the second signal tone measured by the reference receiver at the reference location at a second reference time; (3) receiving a third reference frequency and a third reference phase of the third signal tone measured by the reference receiver at the reference location at a third reference time; and (4) receiving a reference timestamp associated with at least one of the first, second, and third reference times. Determining the geographic location of the system may be also based on the first, second, and third reference frequencies; the first, second, and third reference phases; the reference timestamp; and the reference location. The system of claim 30, where the radio and the processor may be further configured for determining a delta time between the reference location and the geographic location.

In some embodiments, the system may be implemented within a mobile device. The mobile device may be a smart phone, a smart tablet, a smartwatch, an Internet of Things (IoT) device, or the like. The mobile device may also be a land based vehicle, a water based vehicle, an aircraft, or the like. The mobile device may include a second radio configured to be coupled with a wide area network (WAN) and the memory may be configured to receive the first reference data over the WAN. The WAN may include a mobile network and the mobile network may be a 3G wireless network, a 4G wireless network, a 5G wireless network, or the like.

According to another embodiment of the present invention, a method for determining a geographic location and time of a device is disclosed. The device includes a first radio, a processor, and a memory. The method includes (1) deriving a first signal tone originating from a first remote antenna located at a first location; (2) deriving a second signal tone originating from a second remote antenna located at a second location; (3) deriving a third signal tone originating from a third remote antenna located at a third location; (4) determining a first frequency and a first phase at a first time of the first signal tone; (5) determining a second frequency and a second phase at a second time of the second signal tone; and (6) determining a third frequency and a third phase at a third time of the third signal tone. The method further includes determining a geographic location of the device based on the first, second, and third frequencies; the first, second, and third phases; and the first, second, and third locations. The device also includes a memory electrically coupled to the processor. The memory may include a database. The method may further include determining the first, second, and third locations from the memory.

According to another embodiment of the present invention, a non-transitory computer readable storage medium including instructions to be implemented on a system is disclosed. The system includes a processor, a memory, and a first radio. The instructions when executed by the processor cause the system to perform a method including (1) deriving a first signal tone originating from a first remote antenna located at a first location; (2) deriving a second signal tone originating from a second remote antenna located at a second location; (3) deriving a third signal tone originating from a third remote antenna located at a third location; (4) determining a first frequency and a first phase at a first time of the first signal tone; (5) determining a second frequency and a second phase at a second time of the second signal tone; and (6) determining a third frequency and a third phase at a third time of the third signal tone. The method further includes determining a geographic location of the system based on the first, second, and third frequencies; the first, second, and third phases; and the first, second, and third locations. The system also includes a memory electrically coupled to the processor. The memory may include a database. The processor may be further configured for determining the first, second, and third locations from the memory.

According to another embodiment of the present invention, a reference receiver includes a radio; and a processor electrically coupled with the radio. The radio and processor are configured for (1) deriving a first signal tone originating from a first remote antenna located at a first location; (2) deriving a second signal tone originating from a second remote antenna located at a second location; (3) deriving a third signal tone originating from a third remote antenna located at a third location; (4) determining a first reference frequency and a first reference phase at a first reference time of the first signal tone at a first time; (5) determining a second reference frequency and a second reference phase at a second reference time of the second signal tone at a second time; (6) determining a third reference frequency and a third reference phase at a third reference time of the third signal tone at a third time; (7) determining a reference timestamp associated with at least one of the first reference time, second reference time, and third reference time; and (8) transmitting to a remote device the first reference frequency, the first reference phase, the second reference frequency, the second reference phase, the third reference frequency, the third reference phase, and the reference timestamp. The remote device is configured to determine its geographic location based at least partially on the first reference frequency, the first reference phase, the second reference frequency, the second reference phase, the third reference frequency, the third reference phase, and the reference timestamp. The reference timestamp may be based on a Coordinated Universal Time (UTC).

In some embodiments, the first signal tone may be at least a portion of a first licensed broadcast station signal, the second signal tone may be at least a portion of a second licensed broadcast station signal, and the third signal tone may at least a portion of a third licensed broadcast station signal. The processor may also be further configured for receiving the first location from the first licensed broadcast station signal, receiving the second location from the second licensed broadcast station signal, and receiving the third location from the third licensed broadcast station signal.

In some embodiments, the first signal tone may be a FM stereo pilot tone. The second and third signal tones may also be FM stereo pilot tones. In other embodiments, the second signal tone may be an ATSC pilot tone, a terrestrial, repeater-assisted satellite service pilot tone, a DBS pilot tone, or the like.

In some embodiments, the remote device may be configured to receive the first reference frequency, the first reference phase, the second reference frequency, the second reference phase, the third reference frequency, the third reference phase, and the reference timestamp from the Internet, an FM subcarrier, an HD® radio data channel, an ATSC data channel, a cellular communications data channel, a mobile network, or the like.

According to another embodiment of the present invention, a method for determining a geographic location using a reference receiver is disclosed. The reference receiver includes a first radio, a processor, and a memory. The method includes (1) deriving a first signal tone originating from a first remote antenna located at a first location; (2) deriving a second signal tone originating from a second remote antenna located at a second location; (3) deriving a third signal tone originating from a third remote antenna located at a third location; (4) determining a first reference frequency and a first reference phase at a first reference time of the first signal tone at a first time; (5) determining a second reference frequency and a second reference phase at a second reference time of the second signal tone at a second time; (6) determining a third reference frequency and a third reference phase at a third reference time of the third signal tone at a third time; (7) determining a reference timestamp associated with at least one of the first reference time, second reference time, and third reference time; and (8) transmitting to a remote device the first reference frequency, the first reference phase, the second reference frequency, the second reference phase, the third reference frequency, the third reference phase, and the reference timestamp. The remote device is configured to determine its geographic location based at least partially on the first reference frequency, the first reference phase, the second reference frequency, the second reference phase, the third reference frequency, the third reference phase, and the reference timestamp. The reference timestamp may be based on a Coordinated Universal Time (UTC).

According to another embodiment of the present invention, a non-transitory computer readable storage medium including instructions to be implemented on reference receiver is disclosed. The reference receiver includes a processor, a memory, and a first radio. The instructions when executed by the processor cause the reference receiver to perform a method including (1) deriving a first signal tone originating from a first remote antenna located at a first location; (2) deriving a second signal tone originating from a second remote antenna located at a second location; (3) deriving a third signal tone originating from a third remote antenna located at a third location; (4) determining a first reference frequency and a first reference phase at a first reference time of the first signal tone at a first time; (5) determining a second reference frequency and a second reference phase at a second reference time of the second signal tone at a second time; (6) determining a third reference frequency and a third reference phase at a third reference time of the third signal tone at a third time; (7) determining a reference timestamp associated with at least one of the first reference time, second reference time, and third reference time; and (8) transmitting to a remote device the first reference frequency, the first reference phase, the second reference frequency, the second reference phase, the third reference frequency, the third reference phase, and the reference timestamp. The remote device is configured to determine its geographic location based at least partially on the first reference frequency, the first reference phase, the second reference frequency, the second reference phase, the third reference frequency, the third reference phase, and the reference timestamp. The reference timestamp may be based on a Coordinated Universal Time (UTC).

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, devices and systems for using signal tones, single frequency signals that can be characterized by their amplitude, frequency, and phase, such as a commercial frequency modulation (FM) carrier signal or FM stereo pilot tone signal, to provide a general purpose, high-accuracy alternative to the Global Positioning System (GPS). FM radio, for example, is ubiquitous, very high power, and relatively long wavelength. Phase measurements can be very high precision and relatively insensitive to multipath interference. Applications include automobiles, consumer smartphones, aviation, law enforcement, etc. Most any application that is solved with GPS could be solved with this approach. The primary intent is to use signal tones from FM radio, but the method could be applied to other signals such as AM radio, digital TV, cellular, or other emitters.

The present invention employs measurements of the frequency and phase of uncoordinated RF signals to determine position and time at a receiver. Any of a variety of RF transmitted signals could be employed such as AM and FM radio, DTV, cellular broadcasts, or customized or specialized broadcasts. Multiple and different elements of these signals can be used, including carrier signals, pilot tones, and other signal features. No modifications to the broadcast signals are necessarily required. The phases of the received signals are, in part, a function of the distance between transmitters and receiver due to the propagation duration from transmitter to receiver.

FM radio provides particularly useful broadcast signals to employ because, in addition to the carrier signal, also broadcast are FM stereo pilot tones, sinusoidal signals at 19 kHz with ±2 kHz guard bands, providing clearly defined signals for frequency and phase estimation. The higher-frequency carrier signal provides greater resolution (approximately three meter signal wavelength) and a lower-frequency stereo pilot tone provides a lower-resolution measurement (approximately 16 km wavelength). Similar measurements can be made with DTV.

Four key elements of the disclosure are (1) reference device signal measurements, (2) user device signal measurements, (3) reference device communications, and (4) user device position and time computation. The disclosed concept will be described using commercial FM signals for clarity, however other signals may be employed with appropriate modifications.

Figure 1:
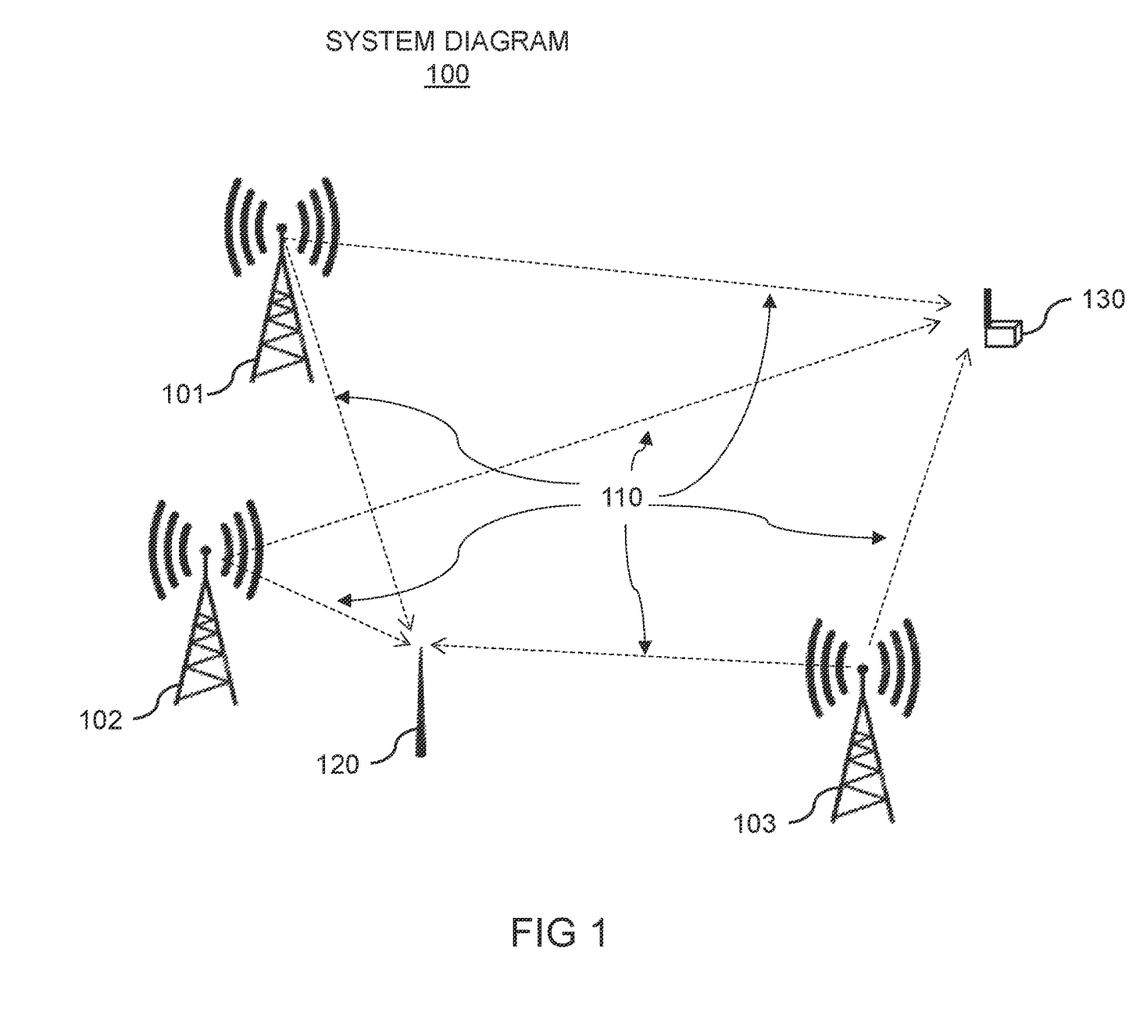
FIG. 1 depicts a system diagram illustrating broadcast radio frequency (RF) transmitters, RF signals, reference equipment (i.e. a reference device), user equipment (i.e. user device) configured to determine its geographic position and time according to an embodiment of the subject matter described herein.

FIG. 1 is a system diagram 100 illustrating broadcast radio frequency (RF) transmitters 101-103, RF signals 110, a reference device 120), and a user device 130 configured to estimate its geographic position and time according to an embodiment of the subject matter described herein. The RF signals 110 are detected and measured by the reference device 120 and the user device 130. Not shown is a data pathway from the reference equipment to the user equipment, which could be via the transmitter broadcast, via another RF transmitter, via the internet, or via other means. There is no limit to the number of transmitters, though for FM in the United States, there are no more than 101 distinct FM channels that can be licensed in any local area. There can be multiple reference devices, 120. And, there is no limit on the number of user devices, 130.

Reference Device Signal Measurements

In an example implementation, reference device 120 are located at fixed, known locations, though in some implementations they could be mobile or at unknown locations. The reference equipment measures the frequency and phase of the multiple broadcast signals 110. One or more reference equipment 120 could operate in a local area.

Figure 2:
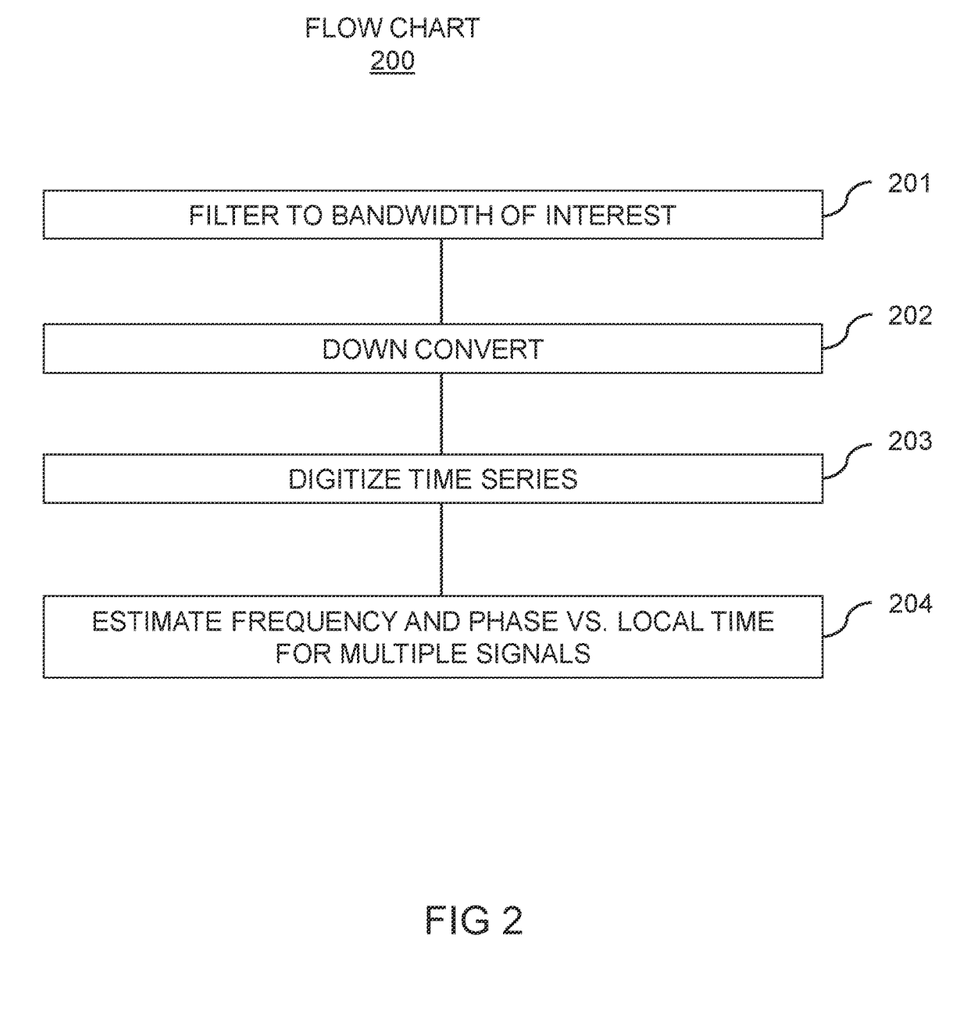
FIG. 2 depicts a flowchart illustrating a method implemented on both the reference device and the user device to facilitate making measurement to estimate the user device geographic location and time according to an embodiment of the subject matter described herein.

FIG. 2 is a flowchart illustrating a method implemented on the device to facilitate locating its geographic position according to an embodiment of the subject matter described herein. In step 201, the input spectrum is first filtered using a bandpass filter to limit the spectral band of interest, such as to the FM band of 87.9 to 107.9 mega-Hertz (MHz). In step 202, the data are optionally down-converted to an intermediate frequency (IF) such as zero-IF, to reduce the necessary digital sample rate. Down-converting can introduce a phase ambiguity of the local oscillator that must be resolved in signal processing. In step 203, the data is digitized producing continuous time series data. In step 204, the frequency and phase of the multiple signal tones are estimated within the band.

The resulting data are time-referenced to the reference device clock. If the reference equipment clock is itself referenced to coordinated universal time (UTC), then the phase and frequency measurements will be referenced (time stamped) to UTC.

Some implementations may implement the device of FIG. 2 for smaller bands than the entire spectrum of interest, possibly focusing on a single band or transmitter. For this implementation, each instance of the device of FIG. 2 will need to be time-referenced to the others so that all resulting data have a common time reference.

The signal tones should be sinusoids that can be modeled using three parameters as shown in Equation [1].

$$s(t-t_0) = \alpha_1 \sin(2\pi\alpha_2(t-t_0) + \alpha_3) \quad [1]$$

Within Equation [1], $\alpha_1$ is the amplitude of the signal tone (a nuisance variable), $\alpha_2$ is the frequency, and $\alpha_3$ is the phase at time $t_0$.

Figure 3:
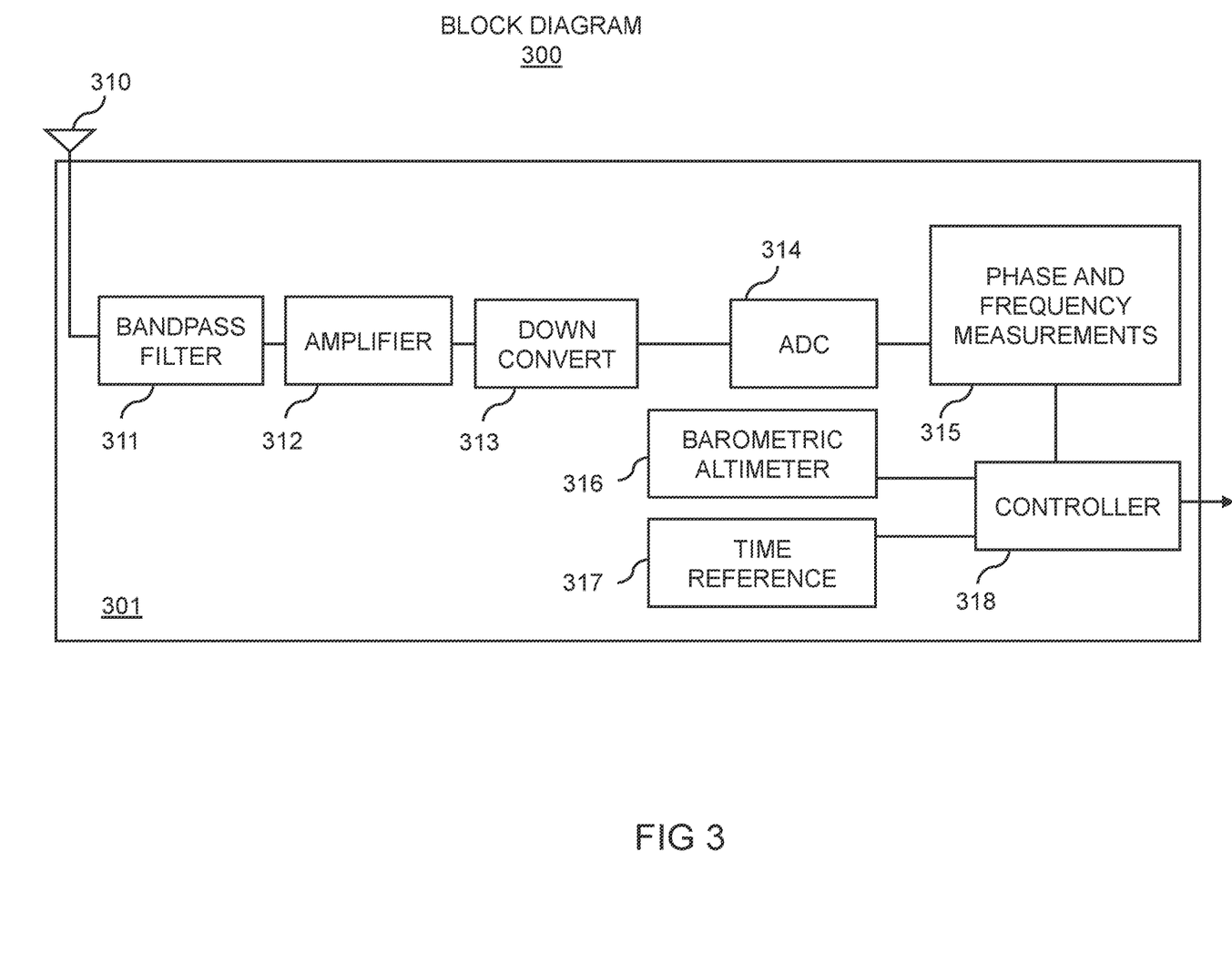
FIG. 3 depicts a block diagram illustrating a preferred embodiment of a reference device according the subject matter described herein.

FIG. 3 is a block diagram 300 illustrating a preferred embodiment of the reference device 301 according to the subject matter described herein. The device 301 includes an antenna 310 that receives all signals within the bandwidth of the antenna. Bandpass filter 311 limits reception to the spectrum of interest. An optional amplifier 312 will amplify the received signal. An optional down conversion 313 will shift the frequency band. The analog to digital conversion (ADC) 314 will digitize the received data. The frequency and phase measurements will be computed in 315 using a computer, field programmable gate array (FPGA), application specific integrated circuit (ASIC), or other computing means. A barometric altimeter 316 is optionally included to provide an independent altitude reference. A time reference 317 is included. The time reference could be a conventional oscillator such as a temperature-controlled oscillator (TCXO), but a preferred time reference would have access to UTC and to report frequency and phase measurements relative to UTC time. A controller 318 with gather the data from the phase and frequency measurements, the barometric altimeter, the time reference, and other descriptive data and output data onto a data channel for use by the user device. The other descriptive data to be sent along with the measurement data could include the transmit station identifiers, descriptive information on the reference device, descriptive information on the quality of the time reference, and quality estimates on the signal measurements.

In a preferred implementation, the reference device may directly sample the entire spectrum (omitting step 202 of FIG. 2), so that physically meaningful phase estimates can be provided without needing to refer to the reference devices local oscillator.

User Device Signal Measurements

User device signal measurements in the preferred embodiment will be computed similarly as computed on the reference equipment, using the data acquisition of FIG. 2.

Figure 4:
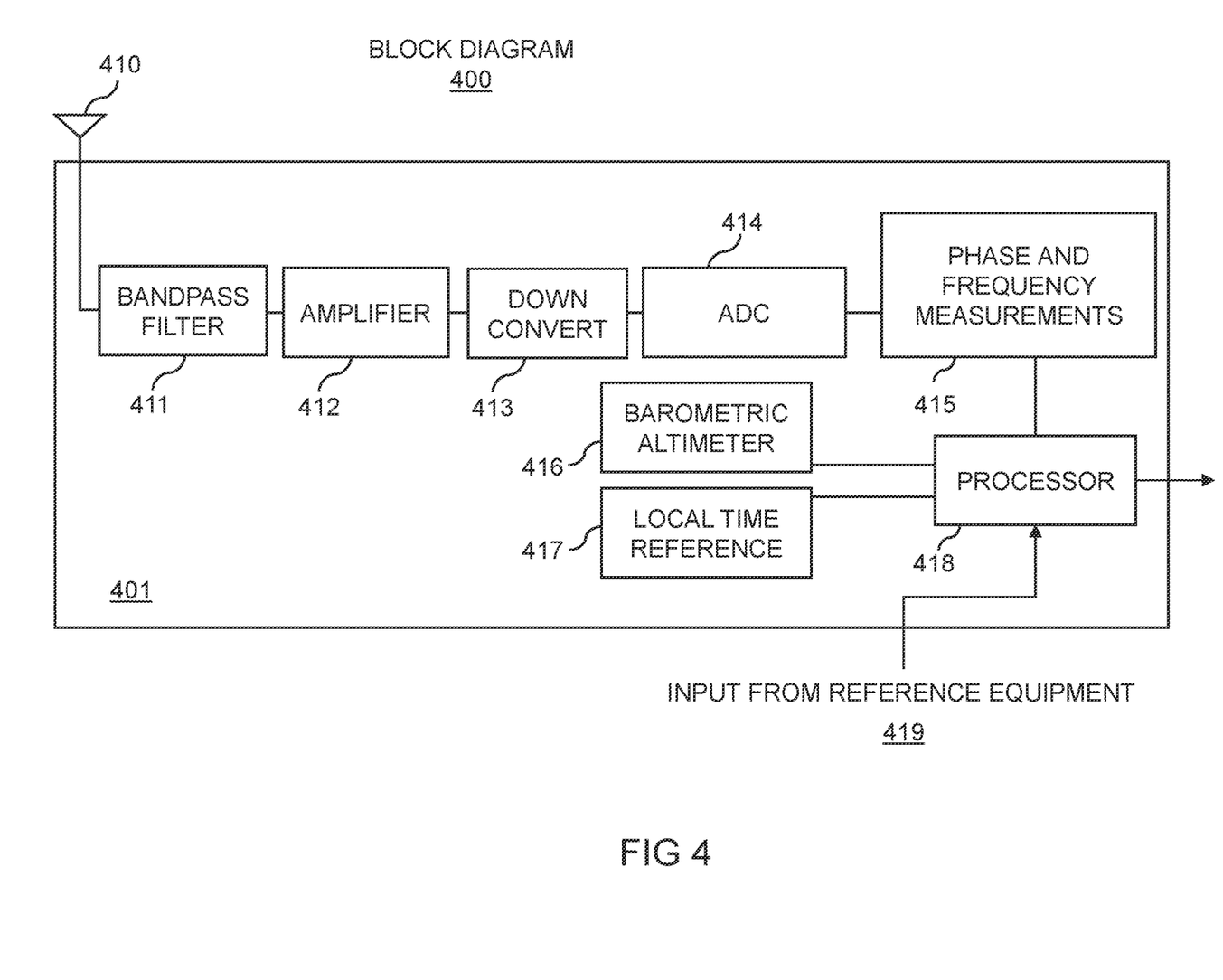
FIG. 4 depicts a block diagram illustrating a preferred embodiment of the user device according to the subject matter described herein.

FIG. 4 is a block diagram 400 illustrating a preferred embodiment of a user device 401 according to the subject matter described herein. The device 401 includes an antenna 410 that receives all signals within the bandwidth of the antenna. Bandpass filter 411 limits reception to the spectrum of interest. An optional amplifier 412 will amplify the received signal. An optional down conversion 413 will shift the frequency band. The analog to digital conversion (ADC) 414 will digitize the received data. The frequency and phase measurements will be computed in 415 using a computer, field programmable gate array (FPGA), application specific integrated circuit (ASIC), or other computing means. A barometric altimeter 416 is optionally included to provide an independent altitude reference. A time reference 417 is included and is expected to be a conventional oscillator such as a temperature-controlled oscillator (TCXO). Input 419 is received from the reference device measurements and data. A processor 418 gathers the data from the phase and frequency measurements, the barometric altimeter, the time reference, and the reference device and will compute and report position and time of the user and optionally error metrics.

For user equipment, the use of a zero-IF down conversion is preferred to minimize the cost of user equipment.

Reference Measurement Communications

User devices need access to the reference device measurements so that the user devices can compute their position relative to the transmitter locations and their time relative to the reference equipment clock.

Data to be transmitted from the reference equipment to the user equipment include frequency and phase vs. time, barometric altimeter measurements vs. time, measures of measurement signal quality and noise, and identity and parameters of the reference device, including its location and source of time information.

A preferred embodiment would provide the reference measurement data to the users via the broadcast transmitter, so that no other receiver is needed at the user equipment. For FM radio, the preferred embodiment would be to transmit the reference equipment measurements via FM subcarriers. FM subcarriers allow digital data to be transmitted along with analog FM broadcasting. One method of FM subcarrier transmission is to use Radio Data System (RDS) or the U.S. standard Radio Broadcast Data System (RDBS). RDS and RDBS allow low-rate digital data transmission concurrent with analog FM broadcasting. An alternative FM subcarrier approach is to use a wider-band subcarrier such as HD Radio or Digital Radio Mondiale (DRM), proprietary digital data transmission capabilities that overlay the FM spectrum. Other FM subcarriers could be employed.

When using FM subcarriers to transmit reference device measurements, locating reference devices near FM broadcast towers or their associated studios is preferred. Other methods of transmitting reference device measurement data would be to use DTV or cellular communications, due to their capacity for transmitting digital data. When employing DTV or cellular data communications, the user equipment would require an appropriate receiving device. Still other methods of transmitting reference equipment measurement data include customized radio frequency signals and transmission via the internet. Additional methods of transmitting reference device measurements are also possible.

Reference devices may require electronics components to transmit reference device measurements to the communications means, such as an appropriate transceiver and supporting elements. User equipment may also require electronic components to receive reference device measurements.

User Position and Time Computation

Computing position and time at the user equipment must accommodate:
1. Broadcast transmission signal phase is entirely unknown a priori and broadcast signal frequency is only approximately known.
2. Measurements of phase provide a measure of fractional wavelength. Transmitter-to-user distances can potentially span many wavelengths.

The data available to the user device may include the user device measurements of frequency and phase vs. local time for each received signal, optionally the user device's measurements of altitude (from the altimeter) vs. local time, the reference device' measurements of frequency and phase vs. time for each received signal, optionally the reference device's measurement of altitude vs. time (from the altimeter), parametric data on the reference device, optionally measures of the reference device and user device measurement quality and noise, the locations of the transmitters of the signals, the transmit power of the transmitters, the antenna type of the transmitters, the location of the reference device antenna, and other information. For FM radio in the U.S., the transmitter location, power, and antenna type are publicly available and could either be stored on a user's device or transmitted by the reference equipment.

Subtracting the reference device measurements of signal phase from the user device measurement of signal phase yields phase differences that indicates the distance differences of the user device and the reference device relative to the transmitters, modulo unknown integer numbers of signal wavelengths. Determination of location and time of the user requires finding the user position and time that best fits the phase difference measurements plus an integer number of wavelengths between the transmitters and the user, so that the measure of fractional wavelengths (the phase differences) plus the number of integer wavelengths, provides distance differences between the user device and the reference device and the transmitters. Because the reference device is at fixed and known distances from the transmitters, reference device measurements serve to calibrate or measure the transmitter frequency and phase vs. time. This estimation process can be considered a phase-difference of arrival (PDOA) method, similar to a time-difference of arrival (TDOA) method, but where the measurement data are signal phases.

Figure 5:
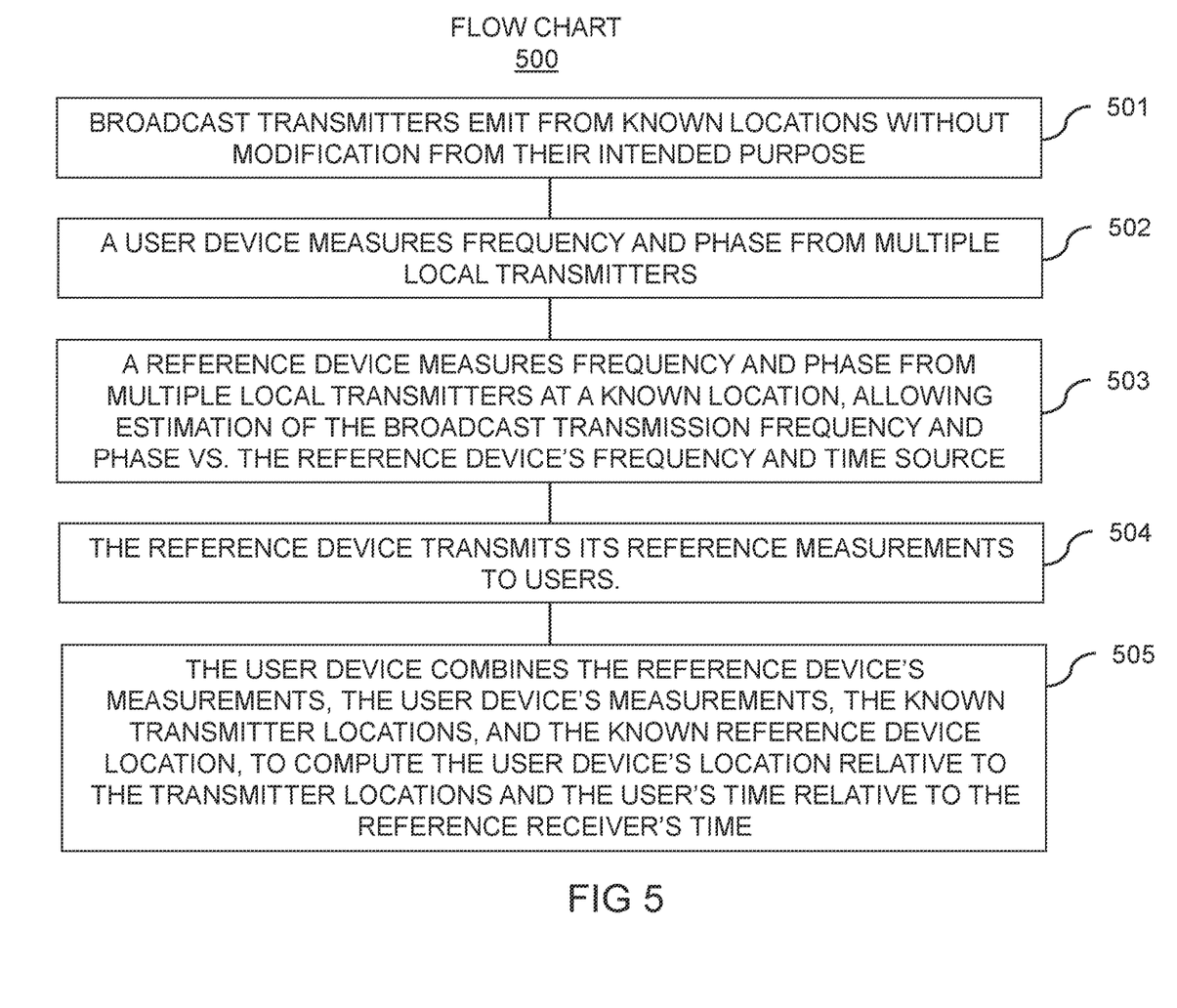
FIG. 5 depicts a flowchart illustrating a method for an example implementation of determining the position and time at a receiver according to an embodiment of the subject matter described herein

In summary, an example implementation for determining the position and time at a receiver is accomplished as shown in FIG. 5. In step 501, broadcast transmitters emit from known locations without modification from their intended purpose (e.g., FM radio broadcasts). The device 510, the reference device, in step 511 measures the frequency and phase of multiple signal tones emitted from the known transmitters in step 501 and time stamped with the reference receiver time. In step 512, the reference device transmits the frequency, phase, time stamp, and other supporting data to the user device 520. In step 521, the user device 520 also makes measurements of frequency and phase of the multiple signal tones emitted by the transmitters, time stamped to the user device local time. In step 522, the user device receives the reference device measurements, combines these with the user device measurements, the known locations of the broadcast emitters, the known location(s) of the reference device(s), and computes the position of the user device relative to the emitters and the reference device and computes the time of the user device relative to the reference device time As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions/acts specified in the flowchart and/or block diagram block or blocks. It will also be understood that each block of the flowchart illustrations and/or block diagrams, and combinations of blocks in the flowchart illustrations and/or block diagrams, may include computations and logic blocks being implemented in programmable logic devices such as a field programmable gate array (FPGA) or a complex programmable logic device (CPLD). Similarly, the computations and logic blocks may be implemented in an application specific integrated circuit (ASIC) and use a combination of embedded processors and logic gates to implement the algorithms.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for determining a geographic location and time, the system comprising:
    a radio; and
    a processor electrically coupled with the radio, wherein the radio and the processor are configured for:
        deriving a first signal tone originating from a first remote antenna located at a first location;
        deriving a second signal tone originating from a second remote antenna located at a second location; and
        deriving a third signal tone originating from a third remote antenna located at a third location;
        determining a first frequency and a first phase at a first time of the first signal tone;
        determining a second frequency and a second phase at a second time of the second signal tone;
        determining a third frequency and a third phase at a third time of the third signal tone; and
        determining the geographic location and the time of the system based on:
            the first, second, and third frequencies;
            the first, second, and third phases; and
            the first, second, and third locations; and
    a memory electrically coupled to the processor.

2. The system of claim h wherein the processor is further configured for determining the first, second, and third locations of the first, second, and third antennas from the memory.

3. The system of claim 1, wherein:
    the first signal tone is at least a portion of a first licensed broadcast station signal;
    the second signal tone is at least a portion of a second licensed broadcast station signal;
    the third signal tone is at least a portion of a third licensed broadcast station signal; and
    the radio and processor are further configured for receiving first identity information associated with the first licensed broadcast station signal.

4. The system of claim 3, wherein the processor is further configured for:
    receiving the first location from the first licensed broadcast station signal;
    receiving the second location from the second licensed broadcast station signal; and
    receiving the third location from the third licensed broadcast station signal.

5. The system of claim 3, wherein:
    the first signal tone is at least one of a frequency modulated (FM) carrier, an FM stereo pilot tone, a digital television (TV) carrier, an Advanced Television Systems Committee (ATSC) pilot tone, an amplitude modulated (AM) carrier, a cellular carrier, and a direct broadcast satellite (DBS) pilot tone;
the second signal tone is at least one of an FM carrier, an FM stereo pilot tone, a digital TV carrier, an ATSC pilot tone, an AM carrier, a cellular carrier, and a DBS pilot tone; and
the third signal tone is at least one of an FM carrier, an FM stereo pilot tone, a digital TV carrier, an ATSC pilot tone, an AM carrier, a cellular carrier, and a DBS pilot tone.

6. The system of claim 3, wherein the radio and the processor are further configured to receive first reference data including first frequency data, first phase data, a first time stamp, and the first location from the first licensed broadcast station signal.

7. The system of claim 6, wherein the first reference data further includes barometric altimeter measurements.

8. The system of claim 7, wherein the system further comprises a second radio configured to be coupled with a wide area network (WAN) and the memory is configured to receive the first reference data over the WAN.

9. The system of claim 8, wherein the WAN comprises a mobile network.

10. The system of claim 9, wherein the mobile network is a least one of a 3G (third-generation) wireless network, a 4G (fourth-generation) wireless network, and a 5G (fifth-generation) wireless network.

11. The system of claim 1, wherein the memory comprises a database.

12. The system of claim 1, wherein:
the radio and the processor are further configured for:
receiving a first reference frequency and a first reference phase of the first signal tone measured by a reference receiver at a reference location at a first reference time;
receiving a second reference frequency and a second reference phase of the second signal tone measured by the reference receiver at the reference location at a second reference time;
receiving a third reference frequency and a third reference phase of the third signal tone measured by the reference receiver at the reference location at a third reference time; and
receiving a reference timestamp associated with at least one of the first, second, and third reference times; and
determining the geographic location of the system is further based on:
the first, second, and third reference frequencies;
the first, second, and third reference phases;
the reference timestamp; and
the reference location.

13. The system of claim 12, wherein the radio and the processor are further configured for determining a time offset between a reference receiver time and an estimated local time based at least partially on a local time reference.

14. The system of claim 1, wherein the system is implemented within a mobile device.

15. The system of claim 1, wherein the system is implemented in at least one of a smart phone, a smart tablet, a smartwatch, and an Internet of Things (IoT) device.

16. The system of claim 1, wherein the system is implemented in at least one of a land based vehicle, a water based vehicle, and an aircraft.

17. A reference receiver comprising:
a radio; and
a processor electrically coupled with the radio, wherein the radio and processor are configured for:
deriving a first signal tone originating from a first remote antenna located at a first location;
deriving a second signal tone originating from a second remote antenna located at a second location;
deriving a third signal tone originating from a third remote antenna located at a third location;
determining a first reference frequency and a first reference phase at a first reference time of the first signal tone at a first time;
determining a second reference frequency and a second reference phase at a second reference time of the second signal tone at a second time;
determining a third reference frequency and a third reference phase at a third reference time of the third signal tone at a third time;
determining a reference timestamp associated with at least one of the first reference time, second reference time, and third reference time; and
transmitting to a remote device the first reference frequency, the first reference phase, the second reference frequency, the second reference phase, the third reference frequency, the third reference phase, and the reference timestamp, wherein the remote device is configured to determine its geographic location based at least partially on the first reference frequency, the first reference phase, the second reference frequency, the second reference phase, the third reference frequency, the third reference phase, and the reference timestamp.

18. The reference receiver of claim 17, wherein the reference timestamp is based on a Coordinated Universal Time (UTC).

19. The reference receiver of claim 18, wherein:
the first signal tone is at least a portion of a first licensed broadcast station signal;
the second signal tone is at least a portion of a second licensed broadcast station signal; and
the third signal tone is at least a portion of a third licensed broadcast station signal.

20. The reference receiver of claim 17, wherein the processor is further configured for:
receiving the first location from a first licensed broadcast station signal;
receiving the second location from a second licensed broadcast station signal; and
receiving the third location from a third licensed broadcast station signal.

21. The reference receiver of claim 17, wherein:
the first signal tone is at least one of a frequency modulated (FM) carrier, an FM stereo pilot tone, a digital television (TV) carrier, an Advanced Television Systems Committee (ATSC) pilot tone, an amplitude modulated (AM) carrier, a cellular carrier, and a direct broadcast satellite (DBS) pilot tone;
the second signal tone is at least one of an FM carrier, an FM stereo pilot tone, a digital TV carrier, an ATSC pilot tone, an AM carrier, a cellular carrier, and a DBS pilot tone; and
the third signal tone is at least one of an FM carrier, an FM stereo pilot tone, a digital TV carrier, an ATSC pilot tone, an AM carrier, a cellular carrier, and a DBS pilot tone.

22. The reference receiver of claim 17, wherein the remote device is configured to receive the first reference frequency, the first reference phase, the second reference frequency, the second reference phase, the third reference frequency, the third reference phase, and the reference timestamp from at least one of:
- the Internet;
- a frequency modulated (FM) subcarrier;
- an HD® radio data channel;
- an Advanced Television Systems Committee (ATSC) data channel;
- a cellular communications data channel; and
- a mobile network.

* * * * *